United States Patent
Cullen

(10) Patent No.: US 6,820,735 B1
(45) Date of Patent: Nov. 23, 2004

(54) BAGGING MACHINE ROTOR TOOTH HAVING A CONCAVE FACE

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 0 days.

(21) Appl. No.: 10/188,559

(22) Filed: Jul. 2, 2002

(51) Int. Cl.[7] .......................... B65B 43/26; B65G 33/30
(52) U.S. Cl. .......................... 198/677; 53/570; 53/527; 100/144; 141/114
(58) Field of Search .................. 198/677, 664, 198/662, 676; 141/71, 73; 53/114, 570, 576, 527, 201, 529, 567; 100/65, 117, 144, 145

(56) References Cited

U.S. PATENT DOCUMENTS

| | | | | |
|---|---|---|---|---|
| 1,073,425 A | * | 9/1913 | Lambert | 198/642 |
| 1,776,751 A | * | 9/1930 | Ditto | 198/642 |
| 2,699,891 A | * | 1/1955 | Kellicott | 198/642 |
| 2,871,021 A | * | 1/1959 | Baldridge et al. | 198/642 |
| 3,228,701 A | * | 1/1966 | Smith et al. | 198/642 |
| 3,687,061 A | | 8/1972 | Eggenmuller et al. | |
| 4,046,068 A | | 9/1977 | Eggenmuller et al. | |
| 4,273,298 A | * | 6/1981 | Boriskin et al. | 241/191 |
| 4,688,480 A | * | 8/1987 | Ryan | 100/144 |
| 4,738,403 A | * | 4/1988 | Sevelinge | 241/275 |
| 4,872,977 A | * | 10/1989 | Jackson | 210/173 |
| 4,907,503 A | * | 3/1990 | Ryan | 100/165 |
| 5,152,717 A | * | 10/1992 | Nelson et al. | 460/122 |
| 5,159,877 A | * | 11/1992 | Inman et al. | 100/144 |
| 5,178,061 A | * | 1/1993 | Alonso-Amelot | 100/65 |
| 5,381,886 A | * | 1/1995 | Hay | 198/642 |
| 5,503,066 A | * | 4/1996 | Koskela et al. | 100/144 |
| 5,671,594 A | | 9/1997 | Cullen | |
| 6,009,692 A | | 1/2000 | Cullen | |
| 6,202,389 B1 | * | 3/2001 | Inman et al. | 53/436 |
| 6,240,980 B1 | * | 6/2001 | Inman et al. | 141/10 |

* cited by examiner

Primary Examiner—Douglas Hess
(74) Attorney, Agent, or Firm—Kolisch Hartwell, P.C.

(57) ABSTRACT

An agricultural feed bagging machine rotor which includes a plurality of rotor teeth mounted thereon with each of the rotor teeth having a tooth face provided thereon. Each of the tooth faces has a progressively increasing thickness from the inner end thereof to the outer end thereof. The outer face of each of the tooth faces has a channel formed therein with the depth of the channel progressively decreasing from the outer end of the tooth face towards the inner end thereof.

27 Claims, 5 Drawing Sheets

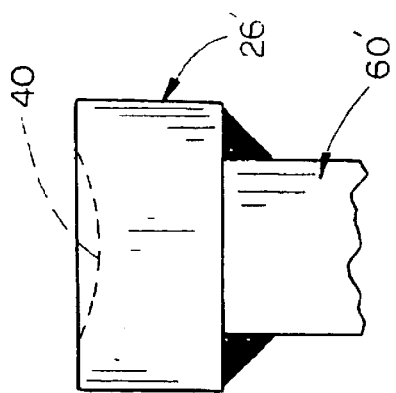
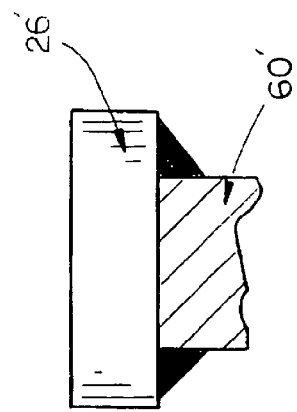
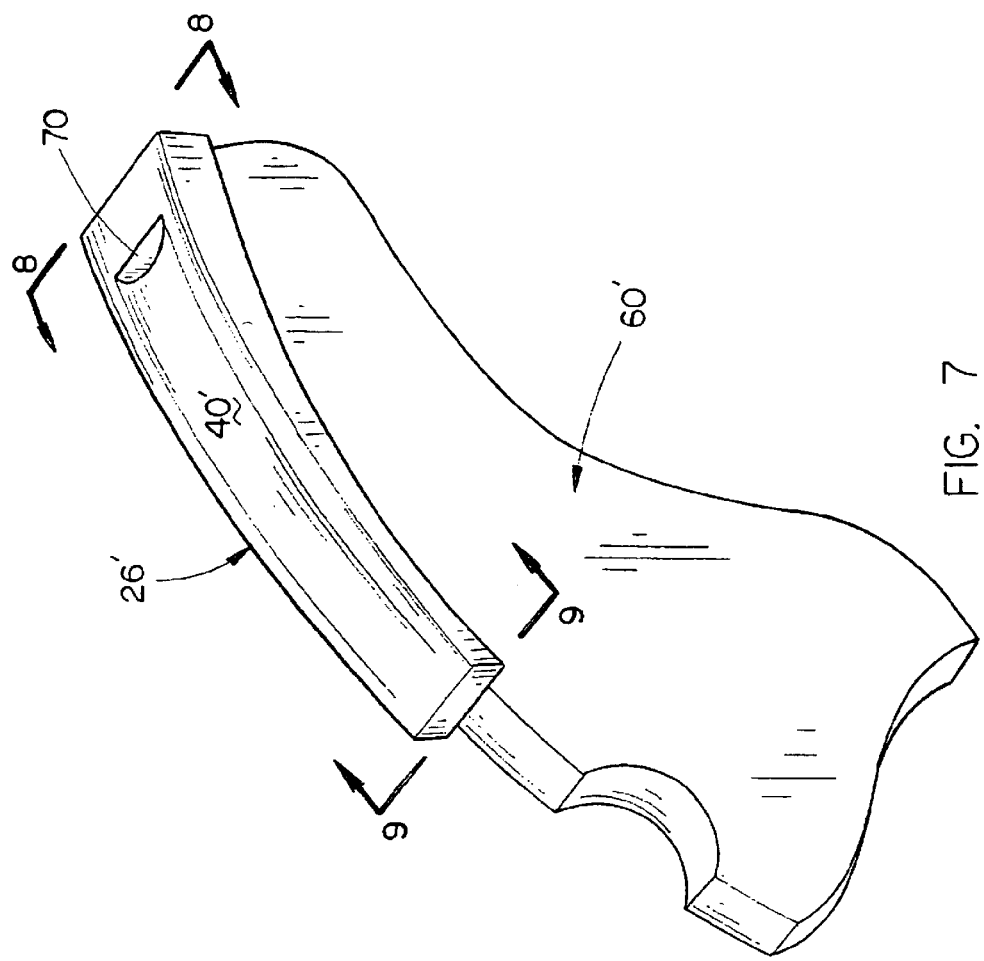

BAGGING MACHINE ROTOR TOOTH HAVING A CONCAVE FACE

BACKGROUND OF THE INVENTION

1. Field of the Invention

This invention relates to a rotor tooth for a bagging machine and more particularly to a bagging machine rotor tooth having a concave face.

2. Description of the Related Art

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the plastic bag is positioned so that the bag is filled. As silage is loaded into the bag, the bagging machine moves away from the filled end of the bag in a controlled fashion in an attempt to achieve uniform compaction of the silage material within the bag.

Most rotors on the bagging machines comprise a plurality of rotor teeth which are welded to the surface of the rotor. A problem exists with the rotor teeth of the prior art bagging machines in that the rotor teeth must be replaced when worn or damaged. Many efforts have been previously attempted in an effort to solve the problems associated with the replacement of the rotor teeth. For example, see U.S. Pat. Nos. 4,907,503 and 5,503,066. Neither of the aforementioned patents discloses any means for replacing the teeth, but simply disclose means for replacing the wear surfaces on the rotor teeth.

In applicant's U.S. Pat. No. 6,009,692, a rotor for a bagging machine is described including quick change rotor teeth. While the rotor of the '692 patent has met with considerable success, the rotor teeth of the '692 patent, as well as all other rotor teeth, still experience considerable wear requiring replacement. Applicant has also utilized replaceable caps which are detachably mounted on the tooth. Although the replaceable caps eliminate the need for replacing the entire tooth when the cap becomes worn, the life of the replaceable caps is not as great as one would like.

In an effort to solve the tooth wear problem, applicant designed chrome steel caps which were mounted on the rotor teeth which utilized the old design of a flat tooth base or surface. In testing of the chrome steel caps for the rotor teeth, it was discovered that most of the wear occurs on the last three inches of the tooth. The sides of the upper end of the tooth are eventually rounded off with the rounding off being caused by the feed prematurely coming around the tooth face at its sides thereby causing the tooth to more quickly wear. The subject of the instant application solves the premature tooth wearing problem and greatly extends the life of the rotor tooth. The instant application also enhances the location and welding of the cap onto the tooth.

SUMMARY OF THE INVENTION

A rotor is provided for an agricultural feed bagging machine with the rotor comprising an elongated, cylindrical body having a horizontally disposed rotational axis. In one embodiment, a plurality of sockets are secured to the rotor in a spaced-apart relationship with respect to each other. A rotor tooth is selectively removably received by each of the sockets and the teeth are positively maintained therein during the operation of the bagging machine. If one of the rotor teeth should become worn or damaged, the tooth may be easily replaced in a matter of seconds, since the rotor tooth is only frictionally maintained in the socket. In yet another embodiment, the rotor teeth are welded to the rotor. Regardless of the manner of securing the rotor teeth to the rotor, each of the teeth has an arcuate leading edge or face with inner and outer ends. The leading edge has a concave channel formed therein. In the preferred embodiment, the concave channel has a depth which progressively decreases from the outer end of the leading edge towards the inner end of the leading edge. In the preferred embodiment, the concave channel terminates outwardly of the inner end of the leading edge. Also in the preferred embodiment, the leading edge or face of the tooth is preferably comprised of a chrome steel material. This tooth face design may be used directly on a rotor tooth or in a separately fabricated tooth cap.

In another embodiment, the outer end of the concave channel terminates in a billet to accommodate additional wear. In another form of the invention, the outer leading edge of the tooth is provided with a notch formed therein which receives a shoulder or tab on the cap to aid in locating and welding the cap on the rotor tooth.

It is therefore a principal object of the invention to provide an improved rotor tooth face design.

A further object of the invention is to provide a rotor tooth having a concave face which increases the life of the tooth.

Still another object of the invention is to provide a tooth face design which may be used directly on a rotor tooth or in a separately fabricated tooth cap.

Still another object of the invention is to provide a tooth face design which is preferably comprised of a chromium steel material.

These and other objects of the invention will be apparent to those skilled in the art.

BRIEF DESCRIPTION OF THE DRAWINGS

FIG. 7 is a perspective view similar to FIG. 2 except that the outer end of the concave channel terminates in a billet;

FIG. 8 is a sectional view as seen along lines 8—8 of FIG. 7;

FIG. 9 is a sectional view as seen along lines 9—9 of FIG. 7; and

DESCRIPTION OF THE PREFERRED EMBODIMENT

Figure 1:
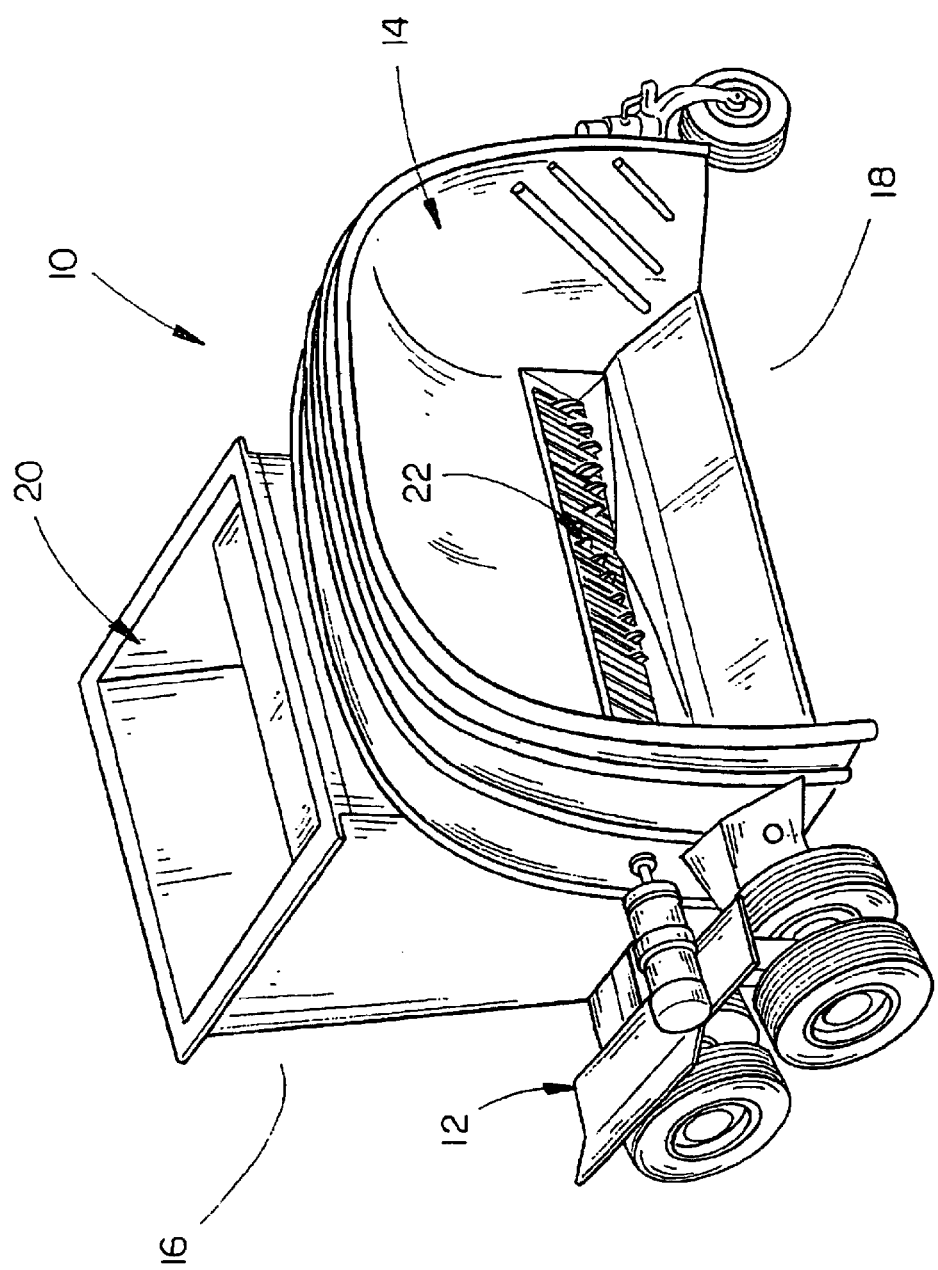
FIG. 1 is a rear perspective view of a bagging machine having the rotor teeth of this invention mounted thereon.

In FIG. 1, the numeral 10 refers generally to an agricultural bagging machine such as disclosed in U.S. Pat. No.

5,671,594. In most machines 10, a wheeled frame 12 is provided having a tunnel 14 mounted thereon upon which is normally positioned the open mouth of a conventional agricultural bag. Although the preferred embodiment includes a wheeled frame, a non-wheeled frame may also be employed on the bagging machine. The machine 10 also includes a conventional power means for driving the various components of the machine and the same will not be disclosed, since the same does not form a part of the invention. The power means could be an engine mounted on the machine or a power take-off (PTO) shaft connected to a tractor PTO.

For purposes of description, the bagging machine 10 will be described as including a forward end 16 and a rearward end 18. Bagging machine 10 includes a hopper means 20 or other material receiving means, such as a feed table, conveyor, etc., at the forward end thereof which is adapted to receive the material to be bagged from a truck, wagon, etc. A horizontally disposed rotor 22 is located at the lower end of the hopper means 20 for forcing the material to be bagged into the tunnel 14 and into the bag in conventional fashion. In one form of the invention, a plurality of sockets are secured to the exterior surface of the rotor 22 by welding or the like in the desired fashion. The particular pattern of the sockets does not form a part of the invention. The sockets and the rotor teeth 60 of FIGS. 1–6 do not form a part of the invention per se with the same being completely disclosed in U.S. Pat. No. 6,009,692.

The instant invention resides in the tooth face which is referred to generally by the reference numeral 26. The tooth face 26 may be used directly on a rotor tooth or a replaceable tooth cap therefore. Further, the rotor teeth 60 may be inserted into the sockets 24 or may be welded directly to the rotor. Further, the sockets 24 may be embedded in the rotor as disclosed in U.S. Pat. No. 6,009,692. For purposes of description, each of the rotor teeth 60 will be described as including an arcuate leading edge 66 and an arcuate trailing edge 68. For purposes of description, each of the rotor teeth 60 will be described as including an outer end 62 and an inner end 64. If the rotor teeth are of the replaceable type such as disclosed in U.S. Pat. No. 6,009,692, each of the teeth 60 will be provided with an arcuate (semi-circular) recess 70 which is complementary in shape to the pivot surface 52 of the socket 24.

Figure 3:
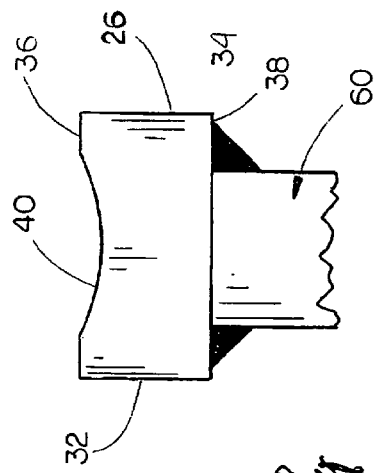
FIG. 3 is a sectional view seen along lines 3—3 of FIG. 2.
Figure 4:
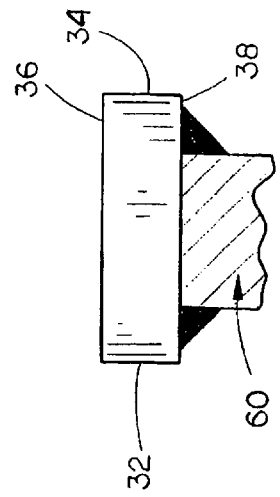
FIG. 4 is a sectional view taken along lines 4—4 of FIG. 2.
Figure 2:
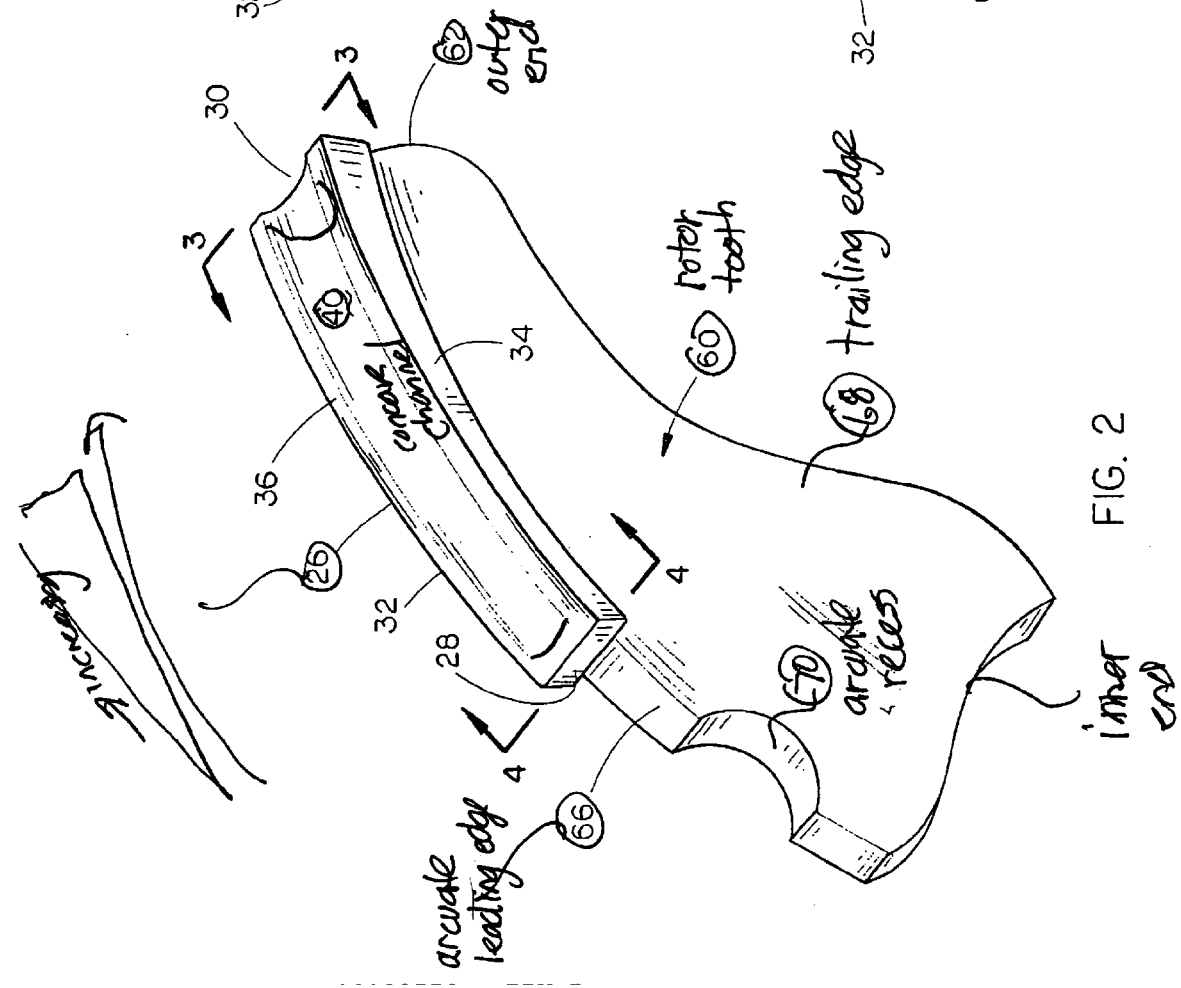
FIG. 2 is a perspective view of rotor tooth having the tooth face of this invention mounted thereon.
Figure 6:
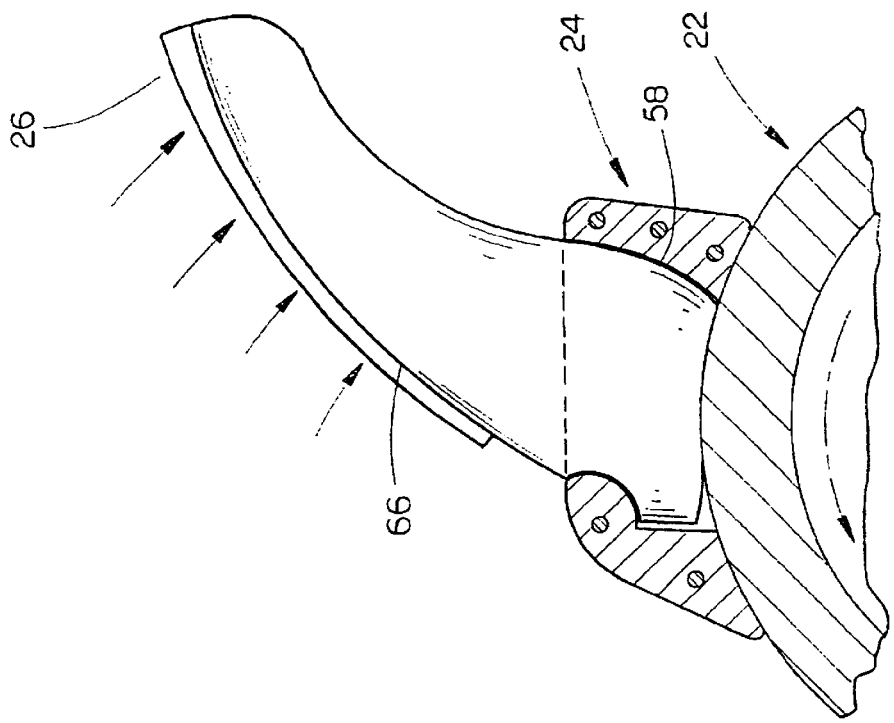
FIG. 6 is a sectional view similar to FIG. 5 except that the rotor tooth has been completely received in the socket.
Figure 5:
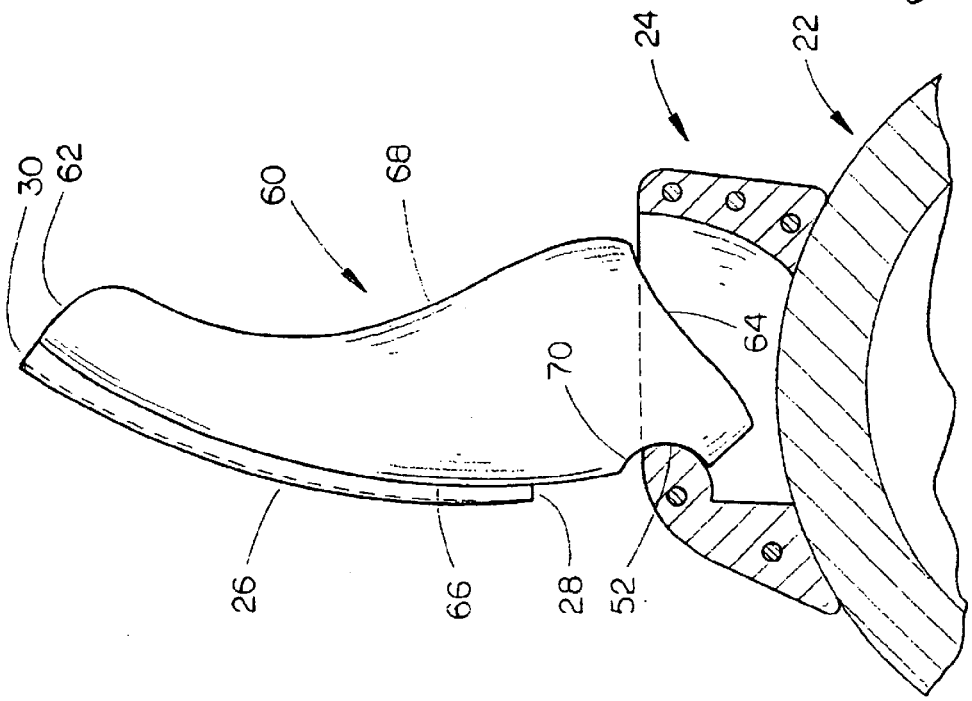
FIG. 5 is a sectional view illustrating a rotor tooth being installed in a respective socket.

Referring now to the tooth face 26, the same will be described as including an inner end 28, outer end 30, opposite sides 32 and 34, outer surface 36 and inner surface 38. Inner surface 38 is complementary in shape to the leading edge 66 of the tooth 60. Tooth face 26 is substantially rectangular in shape when viewed in plan view. As seen in FIGS. 2–6, the thickness of the tooth face 26 progressively increases from its inner end 28 to its outer end 30. As seen in FIGS. 2 and 3, the outer surface 36 of tooth face 26 is provided with a concave channel 40 which extends from end 30 towards end 28. Preferably, the channel 40 terminates outwardly of end 28 of tooth face 26. Preferably, the depth of channel 40 progressively decreases from end 30 towards end 28.

The tooth face 26 may be an integral part of the rotor tooth 60 or may be in the form of a tooth cap which is detachably secured thereto such as disclosed in U.S. Pat. No. 4,907,503. Preferably, the tooth face 26 is comprised of a chromium steel material.

In operation, rotation of the rotor 22 causes the teeth 60 to engage the material being bagged with the tooth face 26 coming into contact with the material. The channel 40 channels the feed off of the end 30 of the tooth face 26 due to the packing pressure of the silage. In this manner, the feed is stopped from prematurely coming around the tooth face at its sides thereby causing the tooth to more quickly wear. Tooth face 26 greatly increases the life of the rotor teeth or the caps mounted thereon.

Figure 10:
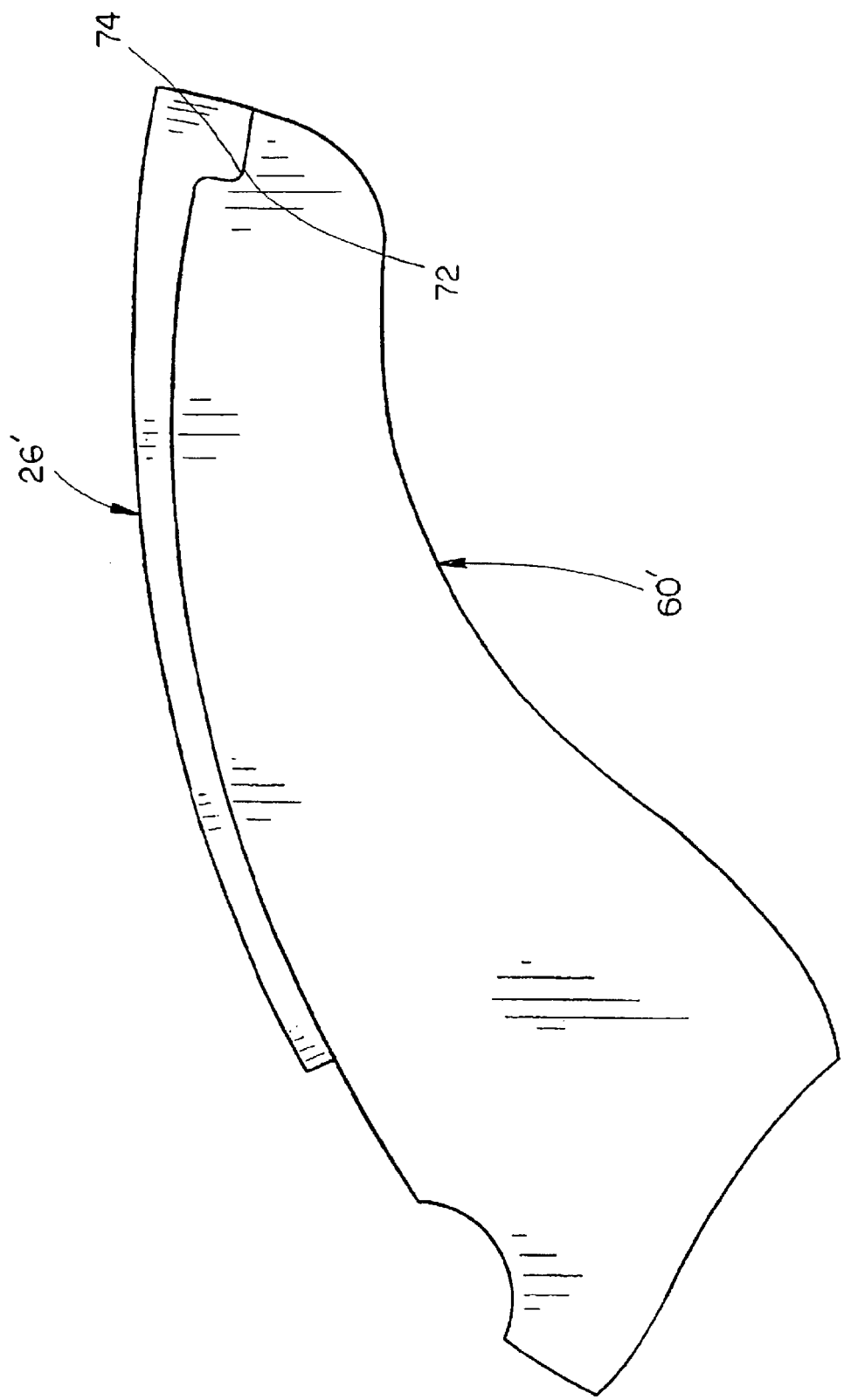
FIG. 10 is a side view illustrating a means for locating the cap on the rotor tooth for welding thereto.

In FIG. 7, a modified form of the concave channel 40' is illustrated. As seen in FIG. 7, the outer end of the channel 40' terminates in a billet 70 to accommodate additional wear. FIG. 10 illustrates a novel means for locating the cap 26' on the rotor tooth 60'. The outer end of tooth 60' is provided with a notch 72 formed therein which receives the shoulder or tab 74 of cap 26' therein to locate the cap 26' with respect to tooth 60' for welding thereby eliminating the need of a jig.

Thus it can be seen that the invention accomplishes at least all of its stated objectives.

What is claimed is:

1. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

said leading edge having an elongated concave channel extending substantially between said inner and outer ends of said leading edge.

2. The rotor of claim 1 wherein said leading edge has opposite sides and wherein said concave channel is formed in said leading edge between said opposite sides.

3. The rotor of claim 1 wherein said concave channel terminates outwardly of said inner end of said leading edge.

4. The rotor of claim 1 wherein said leading edge comprises a tooth cap secured to said rotor teeth and wherein said concave channel is formed in said tooth cap.

5. The rotor of claim 4 wherein said tooth cap is selectively removably secured to said rotor teeth.

6. The rotor of claim 5 wherein said rotor teeth are selectively removably secured to said cylindrical body.

7. The rotor of claim 4 wherein said tooth cap has a width greater than the width of said rotor tooth.

8. The rotor of claim 4 wherein said tooth cap is comprised of a chrome steel material.

9. The rotor of claim 4 wherein said tooth cap has opposite sides and wherein said concave channel is formed in said tooth cap between said opposite sides.

10. The rotor of claim 9 wherein said concave channel terminates outwardly of said inner end of said tooth cap.

11. The rotor of claim 10 wherein said concave channel terminates inwardly of said outer end of said tooth cap.

12. The rotor of claim 11 wherein the outer end of said concave channel terminates in a billet.

13. The rotor of claim 1 wherein said rotor teeth are selectively removably secured to said cylindrical body.

14. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

and a tooth cap secured to each of said rotor teeth;

said tooth cap having inner and outer ends;

each of said tooth caps having an outer surface which has an elongated channel extending substantially between said inner and outer ends of said tooth cap.

15. The rotor of claim 14 wherein said tooth caps are removably secured to said rotor teeth.

16. The rotor of claim 14 wherein said tooth cap has opposite sides and wherein said channel is formed in said tooth cap between said opposite sides.

17. The rotor of claim 15 wherein said channel terminates outwardly of said inner end of said tooth cap.

18. The rotor of claim 14 wherein said channel is concave in shape.

19. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

and a tooth cap secured to each of said rotor teeth;

each of said rotor teeth having a locating notch formed at the outer end of said leading edge; each of said caps having a locating protrusion extending therefrom which is received in a respective notch for locating and welding purposes.

20. A rotor tooth for a bagging machine, comprising:

the tooth having an arcuate leading edge with inner and outer ends;

a tooth cap mounted on said leading edge;

said tooth having a locating notch formed at the outer end thereof;

said tooth cap having a locating protrusion extending therefrom which is received in said notch for locating said cap with respect to said tooth for welding purposes.

21. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

said leading edge having a concave channel formed therein;

said leading edge having opposite sides and wherein said concave channel is formed in said leading edge between said opposite sides;

said concave channel having a depth which progressively decreases from the outer end of said leading edge towards said inner end of said leading edge.

22. The rotor of claim 21 wherein said concave channel terminates outwardly of said inner end of said leading edge.

23. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

said leading edge having a concave channel formed therein;

said leading edge comprising a tooth cap secured to said rotor teeth and wherein said concave channel is formed in said tooth cap;

said tooth cap having inner and outer ends and wherein said tooth cap has a progressively increasing thickness from its inner end towards its outer end.

24. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

said leading edge having a concave channel formed therein;

said leading edge comprising a tooth cap secured to said rotor teeth and wherein said concave channel is formed in said tooth cap;

said tooth cap having opposite sides and wherein said concave channel is formed in said tooth cap between said opposite sides;

said concave channel having a depth which progressively decreases from the outer end thereof towards the inner end thereof.

25. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

and a tooth cap secured to each of said rotor teeth;

each of said tooth caps having an outer surface which has a channel formed therein;

said channel having a depth which progressively decreases from the outer end thereof towards the inner end thereof.

26. A rotor for a bagging machine, comprising:

an elongated, cylindrical body having a horizontally disposed rotational axis;

a plurality of rotor teeth secured to said cylindrical body in a spaced-apart relationship with respect to each other;

each of said teeth having an arcuate leading edge with inner and outer ends;

and a tooth cap secured to each of said rotor teeth;

each of said tooth caps having an outer surface which has a channel formed therein;

said tooth cap having opposite sides and wherein said channel is formed in said tooth cap between said opposite sides;

said channel terminating outwardly of said inner end of said tooth cap;

said channel terminating inwardly of the outer end of the tooth cap.

27. The rotor of claim 26 wherein the outer end of the channel terminates in a billet.

* * * * *